Feb. 1, 1966 M. E. FAULHABER ET AL 3,233,087

COLOR COORDINATE COMPUTER

Filed Feb. 28, 1962 7 Sheets-Sheet 1

INVENTORS
MARK E. FAULHABER
PHILIP D. SCHNELLE
BY Harry J. McCauley
ATTORNEY

INVENTORS
MARK E. FAULHABER
PHILIP D. SCHNELLE
BY Harry J. McCauley
ATTORNEY

INVENTORS
MARK E. FAULHABER
PHILIP D. SCHNELLE
BY Harry J. McCauley
ATTORNEY

Feb. 1, 1966 M. E. FAULHABER ET AL 3,233,087

COLOR COORDINATE COMPUTER

Filed Feb. 28, 1962 7 Sheets-Sheet 4

INVENTORS
MARK E. FAULHABER
PHILIP D. SCHNELLE
BY Harry J. McCauley
ATTORNEY

Feb. 1, 1966 M. E. FAULHABER ET AL 3,233,087

COLOR COORDINATE COMPUTER

Filed Feb. 28, 1962 7 Sheets-Sheet 5

INVENTORS
MARK E. FAULHABER
PHILIP D. SCHNELLE
BY
Harry J. McCauley
ATTORNEY

Feb. 1, 1966 M. E. FAULHABER ET AL 3,233,087

COLOR COORDINATE COMPUTER

Filed Feb. 28, 1962 7 Sheets-Sheet 6

*INVENTORS*
MARK E. FAULHABER
PHILIP D. SCHNELLE

*BY* Harry J. McCauley

ATTORNEY

Feb. 1, 1966 M. E. FAULHABER ET AL 3,233,087

COLOR COORDINATE COMPUTER

Filed Feb. 28, 1962 7 Sheets-Sheet 7

INVENTORS
MARK E. FAULHABER
PHILIP D. SCHNELLE
BY Harry J. McCauley
ATTORNEY

United States Patent Office 3,233,087

Patented Feb. 1, 1966

3,233,087

COLOR COORDINATE COMPUTER

Mark E. Faulhaber and Philip D. Schnelle, Wilmington, Del., assignors to E. I. du Pont de Nemours and Company, Wilmington, Del., a corporation of Delaware Filed Feb. 28, 1962, Ser. No. 176,202

9 Claims. (Cl. 235—193)

This invention relates to an improvement in computer apparatus, and particularly to an analog computer for determining the difference $(F_s^{1/a}-F_r^{1/a})$, where $F_s$ and $F_r$ are, respectively, any two numerical quantities and $a$ lies between 2 and 5. This application is a continuation-in-part of U.S. application Serial No. 57,814 filed September 22, 1960, now abandoned.

Various analytical determinations can be resolved into a difference $(F_s^{1/a}-F_r^{1/a})$, wherein the subscripts $s$ and $r$ denote "sample" and "reference," respectively. One such determination is color measurement and comparison, wherein the difference $(F_s^{1/3}-F_r^{1/3})$ constitutes a useful index over a very wide range of colors, and this has led to the establishment in the art of the Cube-Root Color Coordinate system. This invention is described in detail with particular reference to a color co-ordinate computer determining the differences $(F_s^{1/3}-F_r^{1/3})$ specifically; however, it will be understood that it is broadly adapted to the determination of any such difference wherein the exponents of the two F terms vary from ½ to ⅕, or even more widely.

Figure 1:
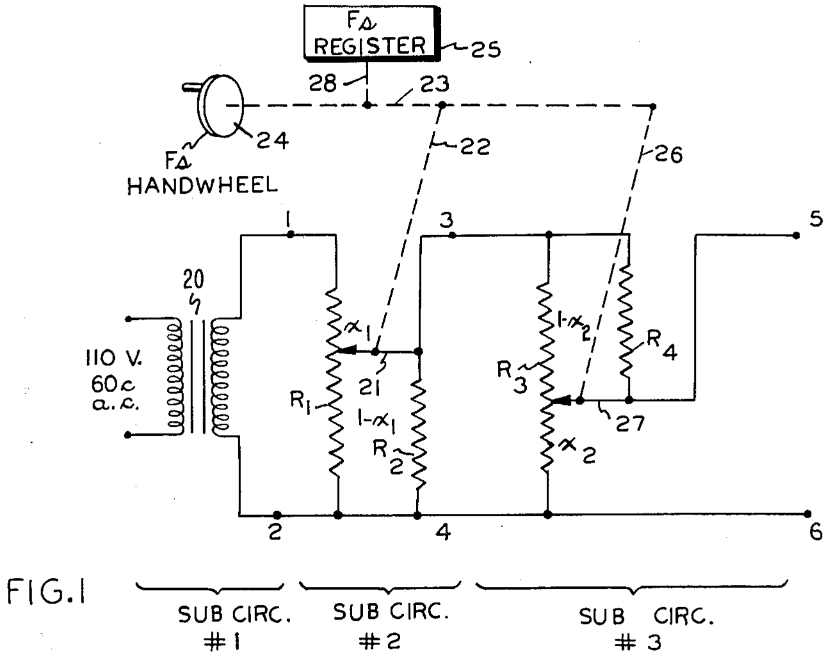
Figure 2:
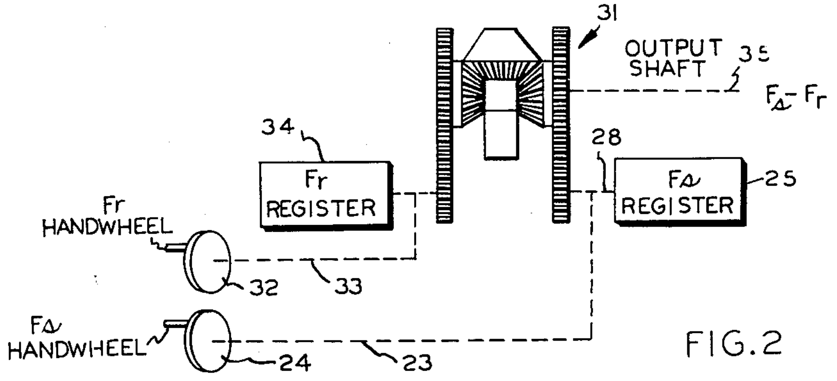
Figure 3:
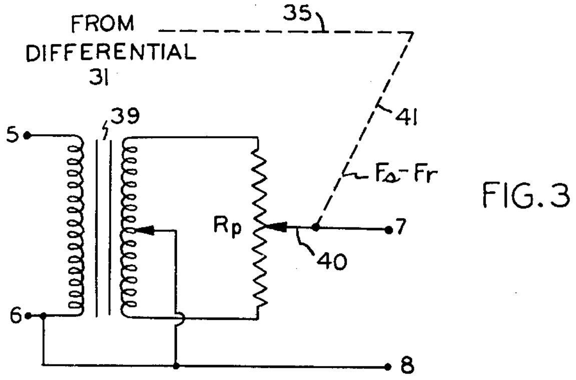
Figure 4:
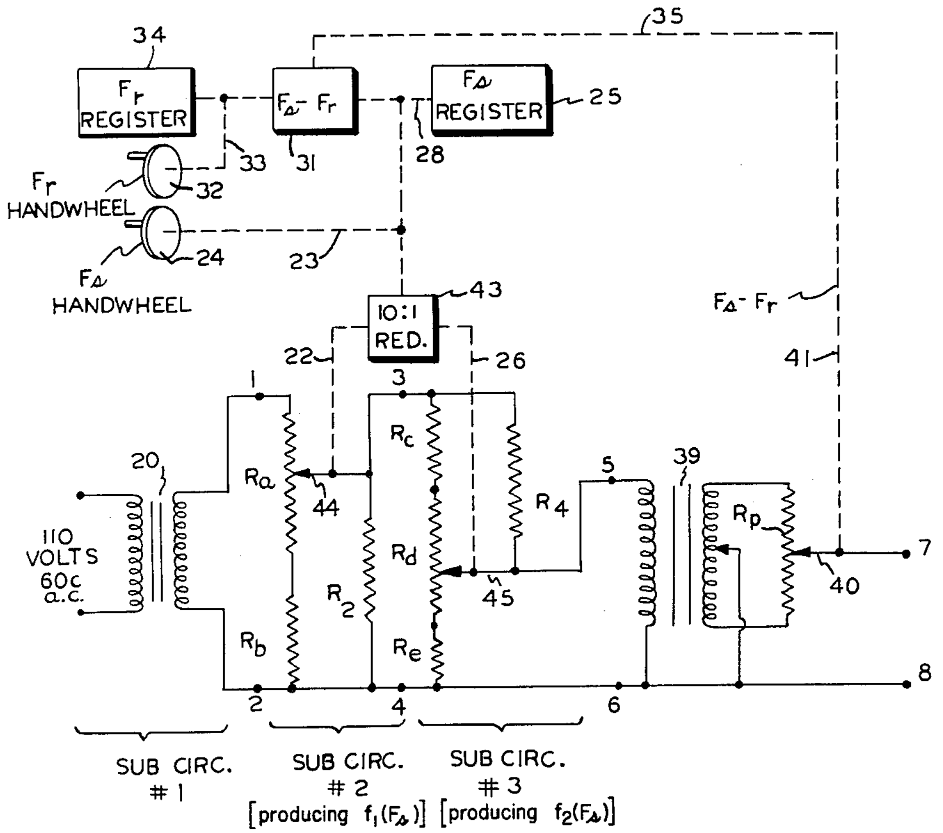
Figure 5:
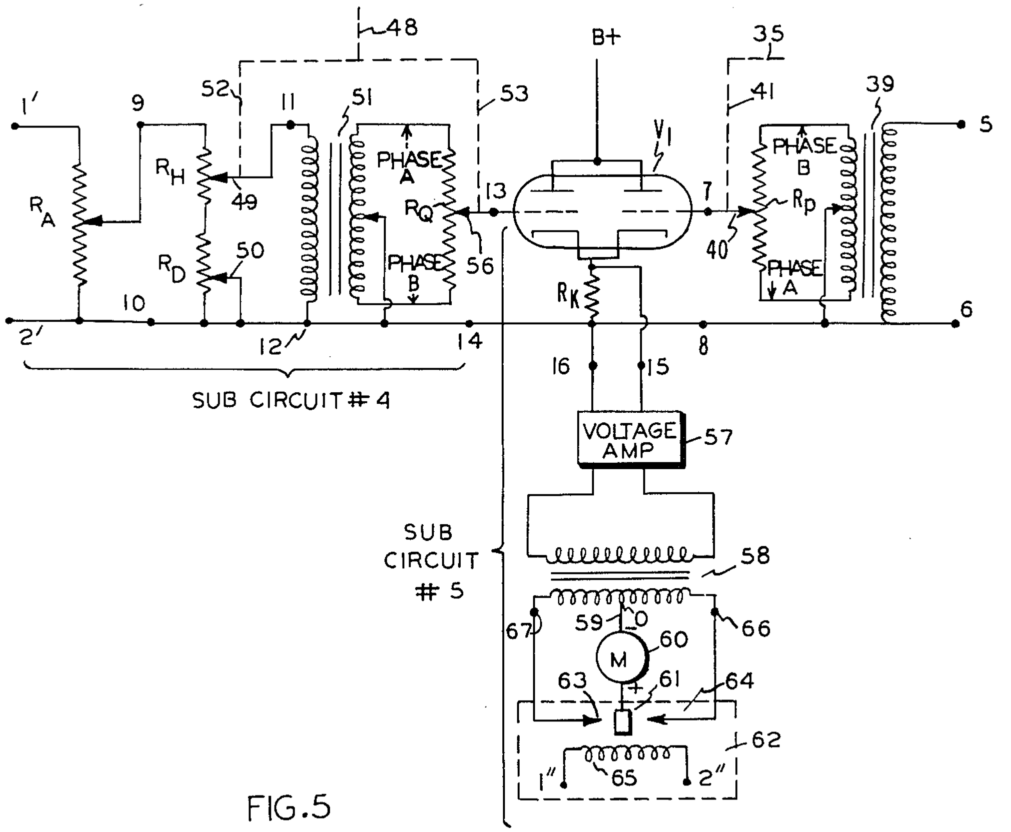
Figure 6:
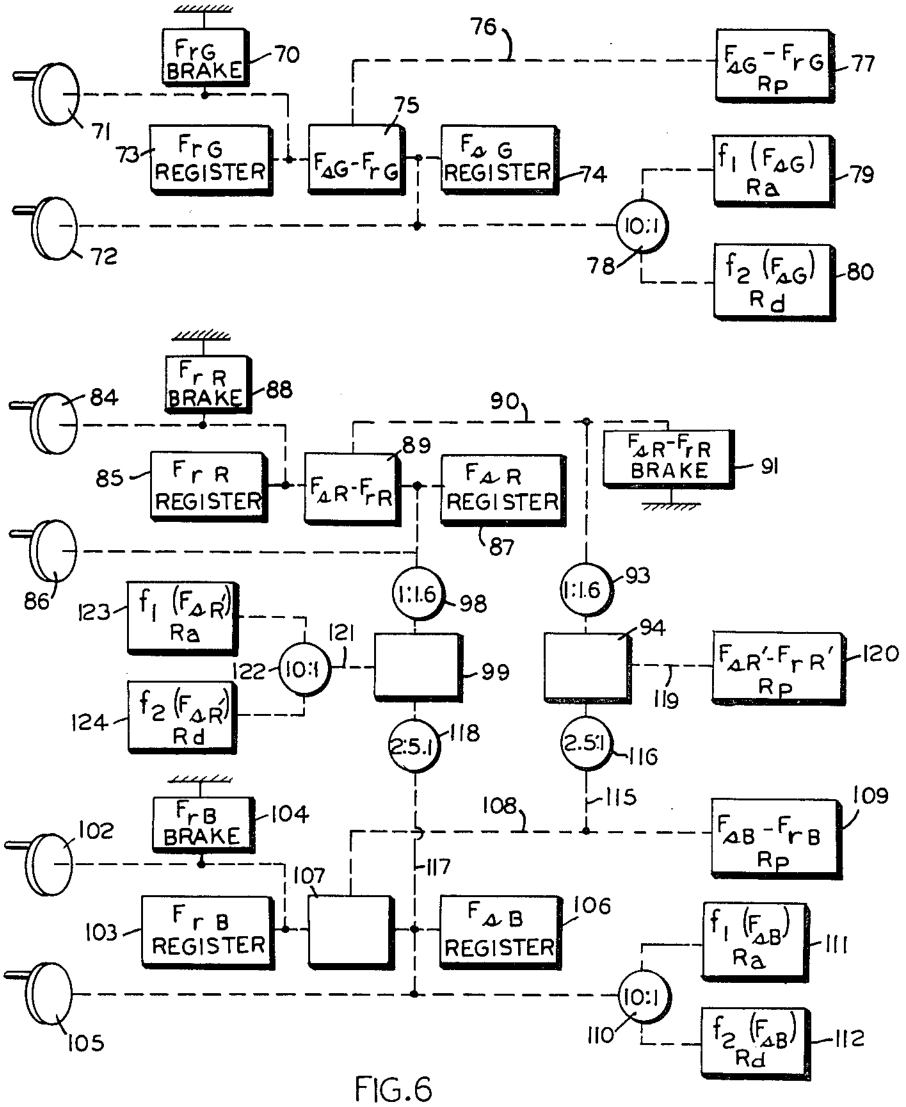
Figure 7:
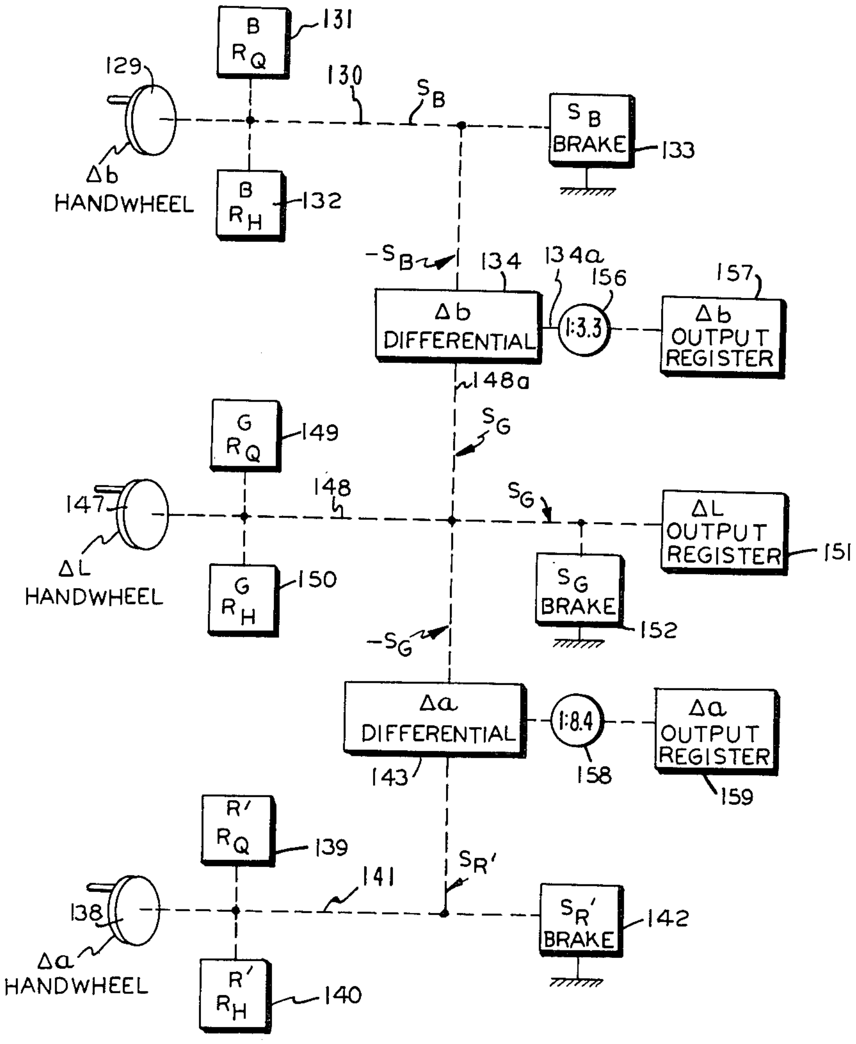
Figure 8:
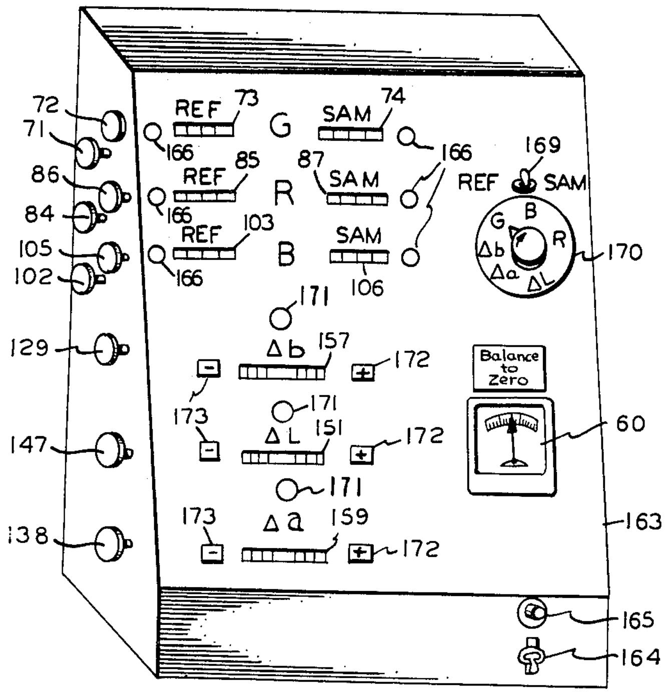

An object of this invention is to provide a computer for the determination of the difference $(F_s^{1/a}-F_r^{1/a})$, wherein $a$ lies in the range of 2 to 5, which is adapted to supplement the laborious manual calculations which have hitherto been required, at the same time improving the accuracy and speed of determination to levels impossible of achievement in sustained human computational activity. Another object of this invention is to provide a computer wherein input data is preserved on registers concurrently with the accumulation of calculated outputs on yet other registers, affording an over-all check of all computation factors during the entire period of a computation cycle as a safeguard against error in the data handling. Other objects include the provision of a computer of the type described which is relatively low in first cost and maintenance, simple in operation, so that it can be used by unskilled personnel, and rugged in design, so that it is practical for industrial use. The manner in which these and other objects of this invention are attained will become apparent from the detailed description of a color co-ordinate computer constructed in accordance therewith and the drawings, in which:

FIG. 1 is a schematic representation of the basic computational circuit used to generate $$\frac{F_s^{1/3}+C_2}{F_s}$$

and utilized in a computer according to this invention, shown together with the mechanical auxiliary required for the introduction of the input, FIG. 2 is a partially schematic representation of a mechanical differential adapted to obtain the difference $F_s-F_r$, FIG. 3 is a partially schematic representation of a sub-circuit adapted to multiply the voltage output $$\frac{F_s^{1/3}+C_2}{F_s}$$

of the circuit of FIG. 1 by $(F_s-F_r)$ obtained from the apparatus of FIG. 2,

FIG. 4 is a schematic representation of a preferred embodiment of the consolidation of circuitry and apparatus of FIGS. 1–3, FIG. 4$a$ is a schematic representation of a second embodiment of consolidated circuitry for the apparatus of FIGS. 1–3, FIG. 5 is a schematic representation of a preferred embodiment of reference voltage generator, together with the associated null detector auxiliary, showing also the electrical connection with the output terminal end of the consolidated circuit of FIG. 4, the orientation of the circuitry terminating in connection points 7 and 8 being reversed in this view to better bring out the fact that sub-circuit 4 is energized from the same power supply as sub-circuits 2 and 3, FIG. 6 is a schematic representation of the entire mechanical combination for a color co-ordinate computer adapted to perform the computational operations which accompany the introduction of data to the apparatus, all details of electrical circuitry being omitted for simplicity of showing, FIG. 7 is a schematic representation of the entire mechanical combination for the apparatus of FIG. 6 devoted to effecting readout of the color difference co-ordinates as well as completion of the calculation started within the sub-assembly of FIG. 6, and FIG. 8 is a perspective view of the front face and left-hand side of the cabinet of the apparatus of FIGS. 6 and 7.

Generally, this invention consists of a computer for the determination of an approximation to the difference $(F_s^{1/a}-F_r^{1/a})$ where $F_s$ and $F_r$ are, respectively, any two numerical quantities and $a$ lies between 2 and 5 comprising in combination a powered loaded potentiometer cascaded electrical network for obtaining as a first term the function $$\frac{(F_s^{1/a}+C_2)}{F_s}$$

where $C_2$ is a constant, means for determining as a second term the difference $(F_s-F_r)$, means for generating a constant term $C_1$, means for obtaining the product of said first term, said second term and said constant term $C_1$, which product is an approximation of the difference $(F_s^{1/a}-F_r^{1/a})$, and means for registering the approximation to the difference $(F_s^{1/a}-F_r^{1/a})$. In one embodiment there is employed as registering means a powered reference voltage circuit including a potentiometric cascaded electrical network and a null detector, the potentiometric cascaded network being connected in opposed circuit relationship through the null detector with the powered loaded potentiometer cascaded electrical network, and means responsive to the powered reference voltage circuit for registering the approximation to the difference $(F_s^{1/a}-F_r^{1/a})$. Also, since it is often desirable to impose a correction function or factor compensating for distortion arising out of changes in magnitude as a function of the polarity of the voltage in the powered loaded potentiometer electrical network, plus some inaccuracy arising from the mathematical method employed for the determination of the difference $(F_s^{1/a}-F_r^{1/a})$, auxiliary means are provided for this purpose.

The mathematical approach underlying the operation of the computer of this invention utilizes a simplifying procedure which entails, in general, the determination of the product $$C_1\left[\frac{F_s^{1/a}+C_2}{F_s}\right](F_s-F_r)$$

where $C_1$ and $C_2$ are both constants and $F_s$ and $F_r$ are, as hereinbefore defined, any two numerical quantities and thus can be the value obtained as the result of an experimental appraisal of a given sample, denoted $F_s$, and a reference against which a comparison of $F_s$ is sought, denoted $F_r$, respectively. We have found that the difference $(F_s^{1/a}-F_r^{1/a})$, which is what it is desired to obtain with a computer of our type, is, to a reasonable approximation, related to the foregoing product, so that the following general expression holds true:

$$(F_s^{/a}-F_r^{1/a})=C_1\left[\frac{F_s^{1/a}+C_2}{F_s}\right](F_s-F_r)\frac{1}{E} \quad (1)$$

wherein E represents the applicable error function which, it has been determined by experiment, varies nearly linearly with the value of either side of the expression if E is omitted therefrom.

Accordingly, in one embodiment we have settled on a calculation procedure which, in effect, involves the transfer of error function E to the left-hand side of Equation 1, whereupon we determine the product remaining on the right-hand side as the first step. Following this, we assume a completely arbitrary value for the quantity in the parentheses $(F_s^{1/a}-F_r^{1/a})$ and then generate, by a predetermined functional relationship, the corresponding product of E by this assumed value, and, if this product does not equal the right-hand product of the expression, then repeat the trial-and-error calculation of $$E(F_s^{1/a}-F_r^{1/a})$$

until substantial equality is achieved, at which time it can be assumed that $(F_s^{1/a}-F_r^{1/a})$ stands determined, within the limitation imposed by the magnitude of E, of course.

A particularly useful application of this invention is as a color co-ordinate computer for the determination of color values in accordance with the Cube-Root Color Coordinate System described in complete detail as regards calculation and comparative aspects with respect to the older Munsell, Adams and Modified Adams color co-ordinate systems in the Journal of the Optical Society of America, vol. 48, No. 10, pp. 736–40, October 1958. Accordingly, the following detailed description relates specifically to color co-ordinate computation which, in general, entails the determination and manipulation of the difference $(F_s^{1/3}-F_r^{1/3})$, i.e., the exponent $1/a=1/3$. Also, as will be seen, color co-ordinate computation can involve a number of intermediate calculations of some complexity and the design of a color co-ordinate computer therefore illustrates the versatility afforded by the basic circuit of this invention, both alone and in combination with additional such circuits as well as in association with inter-relational computation apparatus.

A preferred embodiment of color co-ordinate computer according to this invention incorporates three complete basic circuits which are operated in two modes to receive as inputs each of three reflectance values measured by a colorimeter such as that disclosed in U.S. Patent 2,774,-276 for the sample and reference, respectively, plus certain auxiliary apparatus essential for the accomplishment of transitional computational steps. The three outputs obtained constitute, to a relatively high degree of accuracy, the three color difference co-ordinates ΔL, $\Delta a$ and $\Delta b$ directly of the Cube-Root Color Co-ordinate System.

The Cube-Root Color Co-ordinate System defines the three co-ordinates as follows:

$$\Delta L=25.29\ (F_{sG}^{1/3}-F_{rG}^{1/3}) \quad (2)$$

$$\Delta a=106.0[(F_{sR'}^{1/3}-F_{rR'}^{1/3})-(F_{sG}^{1/3}-F_{rG}^{1/3})] \quad (3)$$

$$\Delta b=42.34[(F_{sG}^{1/3}-F_{rG}^{1/3})-(F_{sB}^{1/3}-F_{rB}^{1/3})] \quad (4)$$

where the nomenclature and design range is as hereinafter set forth:

NOMENCLATURE

*A.—Factors measured on a colorimeter such as described in U.S.P. 2,774,276*

NOMENCLATURE

*A.—Factors measured on a colorimeter such as described in U.S.P. 2,774,276*

| | Sample | Reference | Range |
|---|---|---|---|
| Reflectance (or transmission) with green filter. | $F_{sG}$ | $F_{rG}$ | 0–100% |
| Reflectance (or transmission) with red filter. | $F_{sR}$ | $F_{rR}$ | |
| Reflectance (or transmission) with blue filter. | $F_{sB}$ | $F_{rB}$ | |

NOTE.—The foregoing reflectances (or transmissions) are typically those referred to a standard, such as magnesium oxide, for example, for a preselected illuminant, such as one of the illuminants of the International Commission on Illumination.

*B.—Intermediate red-prime factors (by definition)*

$$F_{sR'}\equiv 0.8F_{sR}+0.2F_{sB}$$
$$F_{rR'}\equiv 0.8F_{rR}+0.2F_{rB}$$

*C.—Visually uniform color co-ordinates*

| Color Factor | Symbol | Theoretical Range in Nat'l. Bur. Standards (NBS) Units |
|---|---|---|
| Lightness | L | 0–100 |
| Redness-greenness | a | +400 to −400 |
| Yellowness-blueness | b | +160 to −160 |

*D.—Color differences*

| | | Design Range in NBS Units | Precision Desired in NBS Units |
|---|---|---|---|
| Between Sample (subscript *s*). | $L_s-L_r=\Delta L$ | ±5 | ±0.1 in the range of from 0 to ±5 |
| and | $a_s-a_r=\Delta a$ | ±21 | |
| Reference (subscript *r*) | $b_s-b_r=\Delta b$ | ±8.3 | |

As a practical matter a completely satisfactory working range of a color co-ordinate computer of the type described herein is one as to which $(F_s^{1/3}-F_r^{1/3})\leq 0.198$ and $1.0\leq F\leq 100$ for both $F_s$ and $F_r$. As a result of empirical adjustment, guided by equality verification over the entire working range, the best approximations we have established for the constants on the right-hand side of Equation 1 are as follows: (a) for values of $F_s$ larger than $F_r$, $C_1=0.3271$ and $C_2=0.2754$, and (b) for values of $F_s$ smaller than $F_r$, $C_1=0.3310$ and $C_2=-0.1441$. The range, in relationship to error, is best seen from the following table:

TABLE OF RANGES AND ERRORS

| | | |
|---|---|---|
| Limits of $F_s^{1/3}-F_r^{1/3}$ | $-0.198\leq F_s^{1/3}-F_r^{1/3}\leq +0.198$ | |
| Limits of $F_s$ | $1.00\leq F_s<5.00$ | $5.00\leq F_s\leq 100.0$ |
| Error (i.e., the difference between the two sides of Equation 1 exclusive of E) | <0.006 | <0.004 |

It should be mentioned that a trained color matcher is not able to detect a color difference of less than about 0.3 N.B.S. unit; however, the accuracy of the colorimeter of U.S. Patent 2,774,276 and also of the table of Cube-Root Color Co-ordinates is about ±0.1 unit, so that a precision of ±0.1 N.B.S. unit for the computer herein described results in the obtainment of the same precision and accuracy possible with hand-calculation methods.

A consideration of Equations 2, 3 and 4 shows that different cube root differences are involved in each, so that it is convenient to provide a computer containing three parallel channels, one each reserved for each of the three computations, together with input registers for reflectances, means for computing the red-prime reflectance as an intermediate calculation based on the red and blue reflectances, means for coupling the red-prime and green cube root differences for use in Equation 3, means for coupling the green and blue cube root differences in Equation 4, means for introducing the several multiplying constants required for each of the three equations (thereby obtaining the desired multiple of the difference $$(F_s^{1/3}-F_r^{1/3}))$$

and readout means for obtaining each of the three computation results ΔL, $\Delta a$ and $\Delta b$.

The preferred embodiment of color co-ordinate computer hereinafter described in detail utilizes for the data reception a 3-stage A.-C. powered loaded potentiometer network which develops an output voltage simulating $$\frac{F_s^{1/a}+C_2}{F_s}$$

A geared mechanical differential is provided, into the two symmetrical arms of which are introduced in opposition $F_s$ and $F_r$ as angular positions of their respective shafts, whereupon the difference $(F_s-F_r)$ is obtained as the angular rotation of the output shaft of the differential. Next in order is an electrical potentiometer with ends connected across the output, $$\frac{F_s^{1/a}+C_2}{F_s}$$

of the A.-C. powered loaded potentiometer network and with movable contact driven by rotation of the output shaft of the $(F_s-F_r)$ differential, thereby producing a voltage between the movable contact and a fixed reference point of zero potential at $(F_s-F_r)=0$ proportional to the product $$\left[\frac{F_s^{1/a}+C_2}{F_s}\right][F_s-F_r]$$

This last product is multiplied by $C_1$, constant over the entire range of the computation, which operation is conveniently effected via a potentiometer together with preset gear ratio provided in the output indication means. As a final measure, a small overall compensatory adjustment is applied to the three-term product proportional to the magnitude of this product by the third stage of the A.-C. powered loaded potentiometer network.

In one embodiment the data reception side of the computer is opposed through an electronic null detector with a potentiometric network provided with manually adjustable supply voltage means having output indication means effecting automatic $C_1$ multiplication with respect to the data reception side of the apparatus as hereinbefore mentioned together with registration of the respective values ΔL, $\Delta a$ and $\Delta b$ upon adjustment to zero voltage differential between the two sides of the apparatus for each of the three computations performed. Three complete sets of the computation assemblies are provided, which are mechanically and electrically coupled together for insertion, during one transaction, of the three reflectances of the sample and the three reflectances of the reference for all three of the primary colors and for output as a result of the transaction of the three color values ΔL, $\Delta a$ and $\Delta b$.

A somewhat simpler embodiment can utilize a sensitive voltmeter as a substitute for the electronic null detector and the opposing potentiometric network as the means registering the approximation to the difference $$(F_s^{1/a}-F_r^{1/a})$$

In order to generate the function $$\frac{F_s^{1/a}+C_2}{F_s}$$

and effect a subsequent compensation as hereinbefore described we have developed a ganged, 3-stage loaded linear potentiometer of novel design. The use of single sections of loaded linear potentiometers as analog computational units is known to the art (refer "Electronic Instruments," M.I.T. Radiation Laboratory, vol. 21, chapter 5, sec. 5.5, McGraw-Hill Book Co., N.Y., 1948); however, the ganging and coupling of multiple units to obtain, with precision, a broad range of exponential functions such as accomplished by this invention has not, to our knowledge, been hitherto done. We have now found that we can obtain our desired functions to a very close approximation over the entire range $a=2$ to $a=5$ by ganging two sections of loaded linear potentiometer in cascade, the second section being loaded in an opposite sense to the first section. In addition, to eliminate residual error, we provide a third potentiometric section in combination with the other two which effects the small final adjustment proportional to the magnitude of the generated function.

Referring to FIG. 1, the several parts of the circuit can be most conveniently related to function if one considers them as more or less independent units, which are severally defined by the brackets drawn in at the bottom and denoted, from left to right, sub-circuits No. 1, No. 2 and No. 3, respectively. Functionally, sub-circuit No. 1 is the power source, which is a transformer 20, the primary winding of which is connected to a conventional A.-C. source, such as 110 v., 60 c., while the secondary winding introduces the input voltage, typically 25 v. A.-C. to the later circuitry by connections 1, 2.

Sub-circuit No. 2 is the first loaded potentiometer of the 3-stage network and is adapted to make the first approximation of the function $$\frac{F_s^{1/3}+C_2}{F_s}$$

and the output of this network, which is hereinafter denoted $f_1(F_s)$, is then effectively multiplied by the function of the second loaded potentiometer network, sub-circuit No. 3, hereinafter referred to as $f_2(F_s)$, to produce a voltage nearly proportional to $$\frac{F_s^{1/3}+C_2}{F_s}$$

all as hereinafter described.

Sub-circuit No. 2 consists of a resistor of $R_1$ ohms connected across 1, 2 provided with an adjustable contact 21 the position of which can be denoted $x_1$, representative of the fractional portion of the resistance interposed between connection 1 and the contact, and $(1-x_1)$, the fractional resistance remainder between the contact 21 and connection 2. Contact 21 is moved up or down $R_1$ by a mechanical connection, indicated schematically by broken line 22, with shaft 23, rotated by hand wheel 24. The angular position of shaft 23 is indicated by a conventional register 25 connected thereto through stub shaft 28, and an additional mechanical connection 26 is provided to gang the adjustable contact 27 of the potentiometer of sub-circuit No. 3 so that it moves in unison with contact 21 of sub-circuit No. 2. Reflectance values read from a colorimeter are introduced into the computer by appropriate manipulation of hand wheel 24, and their values displayed on the register 25, whereupon the positions of potentiometer contacts 21 and 27 are automatically correlated with the angular position of shaft 23 by the gang connection.

The potentiometer of sub-circuit No. 3 consists of a resistor of $R_3$ ohms, the position of contact 27 with respect to which is indicated by $x_2$ between the contact and the common connector running from one side of the transformer secondary through connections 2 and 4, and $(1-x_2)$ between the contact and connection 3, which last is electrically identical with contact 21. Finally, each contact is provided with a fixed loading resistor, $R_2$ for sub-circuit No. 2 and $R_4$ for sub-circuit No. 3, which are connected in opposite relationship, in that $R_2$ runs to connection 2 and $R_4$ to connection 3.

In the literature reference "Electronic Instruments," chapter 5, McGraw-Hill Co. (1948), it is developed that the potentials $E_{3,4}$ and $E_{1,2}$ are related as follows:

$$\frac{E_{3,4}}{E_{1,2}}=\frac{\alpha_1(1-x_1)}{\alpha_1+x_1(1-x_1)}$$

where $$\alpha_1=\frac{R_2}{R_1}$$

With appropriate values of $R_2$ and $R_1$ and a proper choice range $x_1$, sub-circuit No. 2 can be made to produce a function $f_1(F_s)$ which is a rough approximation of the desired $$\frac{F_s^{1/3}+C_2}{F_s}$$

function. Typically, where $0.0\leqq x_1\leqq 0.495$ for $$1.00\leqq F_s\leqq 100.00$$

we have found, by standard mathematical techniques applied to the network relation hereinbefore set forth that, in order to obtain the best possible fit to the curve of the function $$\frac{F_s^{1/3}+C_2}{F_s}$$

$\alpha_1=0.01$ for $F_s\leqq F_r$ and $\alpha_1=0.0075$ for $F_s\geqq F_r$ are entirely satisfactory to the purposes.

The function $f_2(F_s)$ of sub-circuit No. 3 can be regarded as a multiplicative correction of $f_1(F_s)$, so that $f_1(F_s)$ $f_2(F_s)$ approximates $$\frac{F_s^{1/3}+C_2}{F_s}$$

even more closely.

Because of the different circuit configuration, the function of sub-circuit No. 3 is expressible as $$E_{5,6}=E_{3,4}\left[\frac{x_2(\alpha_2+1-x_2)}{\alpha_2+x_2(1-x_2)}\right]$$

where $$\alpha_2=\frac{R_4}{R_3}$$

Using the same techniques as for sub-circuit No. 2, we have determined a single value of $\alpha_2=0.3214$ applicable to all relationships of $F_s$ with respect to $F_r$, at least within the range $1.00\leqq F_s\leqq 100.00$, where $$0.105\leqq x_2\leqq 0.70$$

with the further requirement for the condition $F_s\leqq F_r$ that $E_{5,6}$ be attenuated by a factor of 0.680. The combined circuitry of FIG. 1 delivers at 5, 6 an output voltage which approximates $$\left(\frac{F_s^{1/3}+C_2}{F_s}\right)$$

to within ±2%, which makes possible further later refinement as hereinafter described. It will be understood that, where no higher accuracy is required or where the specific range of interest displays a percentage error somewhat less than the general value mentioned, or where a deliberate preselection of individual resistors, either as linear or slightly non-linear components, is resorted to to reduce the error further, a 2-stage loaded potentiometer cascaded electrical network is perfectly satisfactory for the purposes of this invention. However, the 3-stage design is preferred for service over the entire range $a=2$ to $a=5$.

The next operation is the resolution of $F_s-F_r$, and this is conveniently accomplished by a conventional gear type differential 31 such as that shown in FIG. 2. One input, preferably $F_r$ first, is applied as a unique shaft angular position to one side of differential 31 by turning handwheel 32 to which shaft 33 is fixedly connected, an indication of shaft position at all times being displayed on $F_r$ register 34. Shaft 33 is then locked in position by a suitable brake not shown in FIG. 2, but shown schematically in FIG. 6, and $F_s$ entered as the other input of the differential by turning handwheel 24 and its associated shaft 23. $F_s$ is thereupon displayed on register 25. With shaft 33 locked, the output of the differential in terms of the angular position assumed by shaft 35 is $(F_s-F_r)$. It will be noted that the output shaft 35 final position is identical with its initial position if $F_s$ and $F_r$ are equal, i.e., if registers 25 and 34 display the same readings, which is consistent with the logic of the design, whereas any difference in these readings is reflected in a displacement of shaft 35 proportional to $(F_s-F_r)$.

As indicated by Equation 1 hereinbefore set forth, it is necessary to obtain the product of $$\left(\frac{F_s^{1/3}+C_2}{F_s}\right)$$

and $(F_s-F_r)$, and this is readily accomplished by providing yet another sub-circuit such as that shown in FIG. 3. This comprises a transformer 39 having its primary winding connected across connections 5, 6 of FIG. 1, so as to receive the input of combined sub-circuits 1–3, and its center-tapped secondary winding connected in series with potentiometer $R_p$. If the center tap of 39 is connected to point 6 as shown and the movable contact 40 connected to the output shaft 35 of the differential of FIG. 2 by mechanical connection 41, the output voltage at connections 7, 8 will be zero, regardless of the voltage impressed across 5, 6 if contact 40 is disposed in mid-position with respect to $R_p$, but proportional to the product of $(F_s-F_r)$ and $E_{5,6}$ $$\left(\text{i.e., }\left(\frac{F_s^{1/3}+C_2}{F_s}\right)\right)$$

if 40 is shifted either up or down. Moreover, $E_{7,8}$ will be of a given phase if contact 40 is shifted upwards from mid-position and of a 180° opposite phase if the contact is shifted downwards, thus affording an index of the algebraic sign of the product as related to the sign of the difference $(F_s-F_r)$.

A preferred embodiment of the consolidated measuring circuit and apparatus so far described is shown in FIG. 4, wherein fixed resistors have been employed outside the range where adjustment is needed, thereby to improve the over-all resolution of the system. Thus, sub-circuit No. 2 of FIG. 1 has substituted for its potentiometer $R_1$ the potentiometer $R_a$ connected in series with fixed resistor $R_b$. Because, as hereinbefore described, $x_1$ varies between 0.00 and 0.495 as $F_s$ varies between 1.00 and 100.00, only about one-half of $R_1$ need be of precision potentiometric design and the available resolution in $R_1$ is refined by the factor of two for the sum of $R_b+x_1R_a$. Good resolutions are obtained with a handwheel 24-register 25 (and also for 32–34) design of the 100-turn type employed in conjunction with a 10-turn helically wound potentiometer $R_a$ through the agency of a 10:1 gear reducer 43. Under these circumstances, with the range of $F_s$ defined as $1.00\leqq F_s\leqq 100$, contact 44 of $R_a$ will move over 0.99 of the total resistance in going from $x_1=0$ for $F_s=1$ to $x_1=0.495$ for $F_s=100$. Accordingly, $$\frac{0.99R_a}{0.495}=\frac{R_a+R_b}{1.00}$$

and, solving, $R_a=R_b$. Also, since $$\alpha_1=0.01=\frac{R_2}{R_a+R_b}$$

and $R_a=R_b$, it follows that $R_2=0.02R_a$.

In one apparatus which has been operated extensively in color co-ordinate calculation, the resistor values actually employed were: $R_a$=20,000 ohms, $R_b$=20,000 ohms and $R_2$=400 ohms. For convenience in reference, and consistent with the description hereinbefore set forth, the network $R_a$, $R_b$, $R_2$ is hereinafter denoted the $f_1(F_s)$ network.

Similarly, for the sub-circuit No. 3 network, $R_3$ of FIG. 1 is varied over only a little more than one-half of its total value within the limits $0.105 \lesseqgtr x_2 \lesseqgtr 0.70$ as $1.00 \lesseqgtr F_s \lesseqgtr 100.00$, so that it is convenient to replace it with a fixed resistor $R_c$ in series with a potentiometer $R_d$, which is again a ten-turn type identical with $R_a$, followed by another fixed resistor $R_e$. As before, with the total range of $F_s$ of 99% reflectance, contact 45 of $R_d$ moves from $x_2=0.105$ for $F_s=1$ to $x_2=0.70$ for $F_s=100.00$. Accordingly, the total fractional resistance of $R_d$ relative to $R_3$ is (0.70—0.105) or 0.595 and, since the total travel of contact 45 corresponds to $R_d=0.99$, $0.99\ R_d=0.595\ R_3$. Also, the total fractional resistance of $R_e$ is 0.105 $R_3$ and $R_c=R_3-R_e-R_d$. Finally, $$\alpha_2=\frac{R_4}{R_3}=0.3214$$

as hereinbefore described, so that $R_4=0.3214\ R_3$. For convenience in reference, and consistent with the description hereinbefore set forth, the network $R_c$, $R_d$, $R_e$, $R_4$ is hereinafter denoted the $f_2(F_s)$ network.

Since it is necessary to cascade the $f_1(F_s)$ and $f_2(F_s)$ networks without appreciable loading of the first network by the following network, the input impedance of the $f_2(F_s)$ network, i.e., sub-circuit No. 3, FIG. 4, should be chosen to be at least 50 times the output impedance of the $f_1(F_s)$ network, i.e., sub-circuit No. 2, FIG. 4, which is essentially the impedance of $R_2$. It will be understood that, except for such load avoidance considerations, the actual values of resistance chosen are not important, since the shapes of the functions depend only upon the ratio of resistances. In the typical apparatus described, values of $R_c$=10,000 ohms, $R_d$=20,000 ohms, $R_e$=3,000 ohms, and $R_4$=10,000 ohms proved entirely satisfactory.

The other components, such as the $F_r$ handwheel 32-register 34, $(F_s-F_r)$ output shaft 35 and mechanical connection 41 with contact 40 of $R_p$ are also drawn in in FIG. 4, and the circuit relationship of transformer 39 with respect to sub-circuits No. 1–No. 3 together shown, the several numbered connection points hereinbefore described being also denoted.

The remaining circuitry required for the computation of $(F_s^{1/3}-F_r^{1/3})$ is shown for the null detector embodiment of this invention in FIG. 5 in association with the final stage of the function generator of FIG. 4.

Generally, this comprises sub-circuit No. 4, which is the reference voltage generator, and sub-circuit No. 5, inclusive of coincidence tube $V_1$, which is a conventional null detector circuit adapted to be manually rebalanced as hereinafter described. The terminal end of the circuit of FIG. 4, consisting of transformer 39 with its tapped secondary winding and series-connected potentiometric resistance $R_p$ provided with movable contact 40 and mechanical connection 41, is drawn in to show the introduction of $(F_s-F_r)f_1(F_s)f_2(F_s)$ into $V_1$.

The generation of $$\frac{F_s^{1/3}+C_2}{F_s}$$

hereinbefore described entails two undesirable operations, namely, the necessity for changing $\alpha_1$ in the $f_1(F_s)$ sub-circuit No. 2 and also for adjusting the attenuation of the $f_2(F_s)$ sub-circuit No. 3, both in accordance with the algebraic sign of the existing color difference, i.e., the polarity. To accomplish these operations directly would require rather complex circuitry, therefore, resort was had to the introduction of a compensation factor effecting the accuracy refinement hereinbefore referred to in the operation of sub-circuit No. 4, which accomplishes both corrections simultaneously and also compensates for some slight approximation inherent in the mathematical method adhered to in the computation. Under these circumstances it was possible to retain $\alpha_1$ constant at 0.01 over the full range of measurement for the typical apparatus described while still retaining high accuracy.

The introduction of the compensation factor is effected automatically by movement of the adjustable mechanical connection 48 incident to the manual balancing out of the null detector on the one hand and the registering of the values of $\Delta L$, $\Delta a$ and $\Delta b$ on their individual registers on the other, all as hereinafter described. The compensation factor $X_m$ is an empirical approximation to an error function $\epsilon$ the latter being defined as:

$$\epsilon \equiv \frac{(F_s^{1/3}-F_r^{1/3})}{(F_s-F_r)f_1(F_s)f_2(F_s)} \doteq X_m$$

Mathematical analysis reveals that $\epsilon>1.0$ for positive values of $(F_s-F_r)$ and $\epsilon<1.0$ for negative values of $(F_s-F_r)$ and that the magnitude of the error increases with increasing magnitude of $(F_s-F_r)$ owing to the series approximation underlying Equation 1 hereinbefore set forth. Accordingly, it is necessary that the compensation factor $X_m$ be calibrated for zero error at both the positive and the negative maximum values of $$(F_s^{1/3}-F_r^{1/3})$$

hereinbefore established at ±0.198 for the apparatus described. Also, since the compensation is, for convenience, introduced in the reference network, sub-circuit No. 4, it approximates the inverse of $\epsilon$ in accordance with the following formula applicable to the circuit as a whole. That is, at balance: $(F_s-F_r)f_1(F_s)f_2(F_s)$, derives from sub-circuits Nos. 1–3 collectively, equals $(F_s^{1/3}-F_r^{1/3})1/X_m$ derived from sub-circuit No. 4, or $$(F_s^{1/3}-F_r^{1/3})=(F_s-F_r)f_1(F_s)f_2(F_s)X_m$$

Referring to FIG. 5, the same supply voltage is applied to sub-circuit No. 4 as to the $f_1(F_s)$ and $f_2(F_s)$ networks of FIG. 4, which is achieved by connecting sub-circuit No. 1 of FIG. 4, not repeated in showing in FIG. 5, across connection points 1'–2', identical with 1, 2.

Potentiometer $R_A$ is a scale setting device used in conjunction with $R_D$ in the initial calibrations and adjustments of the apparatus as hereinafter described and these collectively generate the constant term $C_1$ of Equation 1 hereinbefore referred to (however, in the inverted form $1/C_1$). Typically $R_A$ can have a value of 100 ohms, while $R_D$ and $R_H$ should be much larger in order not to load or interact with $R_A$. Typically, $R_D$ can be 15,000 ohms and $R_H$ can be a 10-turn precision potentiometer of 1000 ohms. The setting of $R_A$ determines the fraction of the supply voltage $E_{1',2'}$ impressed across points 9, 10 with respect to which $R_H$ and $R_D$ are series-bridged.

The movable contact 49 of $R_H$ is series-connected to the primary of transformer 51, the opposite terminal of which is connected to the supply line common at 12. Transformer 51 can be of similar design to transformer 39, with the center tap of the secondary connected to the supply common. The secondary of 51 is bridged by potentiometer $R_Q$, typically 1000 ohms. Movable contact 56 takes off potentiometer $R_Q$ a voltage, referred to the supply common at 14, proportional to its displacement from center position and of one of two phases, denoted phase A and phase B, respectively, in FIG. 5.

Thus in one direction of displacement, the output phase is the same as the supply voltage, whereas, in the other direction of displacement, the output phase is opposite to that of the supply voltage, an operation similar to that hereinbefore described for potentiometer $R_p$ but opposite in relative phase relationship therefrom.

Contact 56 of potentiometer $R_Q$ and contact 49 of potentiometer $R_H$ are mechanically ganged together through shafts 52 and 53 to a common shaft 48 which is manually operated by an adjusting knob provided for the purpose of manual null-balancing as hereinafter described.

With this circuit, the correction term $1/X_m$ hereinbefore mentioned is generated by the variation of the voltage $E_{11,12}$ as a function of the setting of $R_H$ contact 49, gang-connected so that it moves in accompaniment with contact 56 of potentiometer $R_Q$. Therefore $E_{13,14}$ is a function of the position of mechanical connection 48, and of the angular position of any shaft, not shown in FIG. 5, connected therewith.

Comparison of the output of the reference circuit, sub-circuit No. 4, $E_{13,14}$ with the output of the measuring circuit $E_{7,8}$ is conveniently achieved by impressing each on the individual grids of a dual triode tube $V_1$, typically a type 5844, connected as a cathode follower and having its plates connected to a common B+ source of 150 volts. The cathode resistor $R_K$ is typically 10,000 ohms and the A.-C. voltage $E_{15,16}$ appears thereacross, which is proportional to the sum of $E_{13,14}$ and $E_{7,8}$. It will be understood that, since $E_{13,14}$ and $E_{7,8}$ can have either of the two phases A or B 180° apart hereinbefore mentioned, one of which is identical in phase with $E_{1,2}$ and $E_{1',2'}$, $E_{15,16}$ is zero if, and only if, $E_{13,14}$ equals $E_{7,8}$ in magnitude and is reversed in phase, it being assumed, of course, that $E_{13,14}$ and $E_{7,8}$ are of the same frequency, as is the situation here. Since $E_{7,8}$ is proportional to $$(F_s-F_r)f_1(F_s)f_2(F_s)$$

and $E_{13,14}$ is proportional to $$\left(\frac{F_s^{1/3}-F_r^{1/3}}{X_m}\right)$$

it is clear that, when $E_{15,16}=0$, the position of mechanical connection 48, and any shaft connected therewith, is proportional to the desired $(F_s^{1/3}-F_r^{1/3})$.

The operation of bringing mechanical connection 48 to its correct position to balance $E_{13,14}$ against $E_{7,8}$ is effected with the aid of a panel meter 60 (FIG. 5) indicating both the magnitude and the phase of the existing unbalance, so that the exact null point can be speedily attained. A single null-balancing sub-circuit No. 5 is employed to effect each of the three individual null-balancings required for the three registrations $\Delta L$, $\Delta a$ and $\Delta b$ in turn by sequential switching as hereinafter described. Thus, sub-circuit No. 5 includes a zero-center phase-sensitive voltmeter circuit comprising a voltage amplifier 57 with gain of 5000 connected across 15, 16 as input and delivering its output to the primary winding of transformer 58. Meter 60 is connected between a center tap 59 to the secondary winding of the transformer and the vibrating element 61 of the electromagnetic chopper, indicated generally at 62. Chopper 62 may be of commercial design, such as an Airpax No. 181 provided with contacts 63 and 64 connected to opposite ends of the secondary winding of 58 and actuated by driving coil 65, which is supplied with current derived from the identical source connected across 1, 2 and 1', 2', hereinbefore described, as indicated by connections 1'', 2''.

The operation of electromagnetic chopper 62 is as follows. If it is assumed that phase A, hereinbefore mentioned, is that of $E_{1,2}$, $E_{1',2'}$, and $E_{1'',2''}$ and the frequency remains unchanged regardless of phase, it will be understood that vibrating element 61 closes the electrical circuit with contact 64 when the voltage in driving coil 65 reaches its maximum. Similarly, when the voltage in coil 65 drops to its minimum, 61 closes on contact 63. These two switch closures cause currents to flow in unique directions through meter 60 corresponding to the phase of the current flow through the transformer primary with characteristic movement of the needle thereof away from the zero point indicative of null balance. As an example, if $E_{15,16}$ has phase A, it will be in phase with $E_{1'',2''}$, so that both reach their respective maximum and minimum values at the same instant in time. The right-hand terminal 66 of the secondary winding of transformer 58 (together with contact 64) is thus positive with respect to the secondary midpoint 0 at the same instant that vibrating element 61 closes circuit with 64, thereby completing the right-hand loop and causing current to flow through meter 60 in the direction of the meter's positive indication, as represented by the plus sign drawn adjacent the meter. Similarly, when $E_{15,16}$ reaches its negative maximum the left-hand terminal 67 of the secondary (together with closed contact 63) is again positive with respect to 0, whereupon current flows in the left-hand loop in a clockwise direction which corresponds to continued deflection of the needle of meter 60 in the positive direction.

If $E_{15,16}$ is of phase B., i.e., 180° out of phase with A as hereinbefore described, $E_{15,16}$ reaches its positive maximum when coil voltage $E_{1,2}$ reaches its negative maximum, and vice versa. Accordingly, at the instant that vibrating element 61 closes on contact 63, transformer connection 67 is negative with respect to midpoint 0 and current flows within the left-hand loop including meter 60 in a direction exactly opposite to that which occurred when $E_{15,16}$ was of phase A, whereupon the needle of meter 60 deflects in the negative direction indicated by the minus sign drawn adjacent the meter. Also, when $E_{15,16}$ reaches negative maximum, transformer connection 66 has become negative with respect to midpoint 0 of the secondary and, with the right-hand loop closed by contacts 61, 64, current continues to flow through meter 60 in the direction of negative meter indication.

The third possible condition is that $E_{13,14}$ exactly balances out $E_{7,8}$, in which case no voltage is induced in the secondary of transformer 58, which is precisely the condition of null balance which must be achieved to attain the accurate valves of $\Delta L$, $\Delta a$ and $\Delta b$ computed by the apparatus.

Operation remains practically unaffected by spurious frequencies or unwanted phases of the signal frequencies, such as 120 c. power supply ripple or 60 c. "pickup," which last is usually 90° out of phase with the signal voltage.

The foregoing description has been devoted to the generalized determination of $(F_s^{1/3}-F_r^{1/3})$, which permits the direct computation of $\Delta L=25.29\ (F_{sG}^{1/3}-F_{rG}^{1/3})$ and $$\Delta b=42.34[(F_{sG}^{1/3}-F_{rG}^{1/3})-(F_{sB}^{1/3}-F_{rB}^{1/3})]$$

The remaining co-ordinate of interest, $$\Delta a=106[(F_{sR'}^{1/3}-F_{rR'}^{1/3})-(F_{sG}^{1/3}-F_{rG}^{1/3})]$$

necessitates a preliminary calculation, since $$F_{R'}=0.8\ F_R+0.2\ F_B$$

and is not measurable directly by the colorimeter but, instead, involves an intermediate calculation from the blue and red measured reflectances, so that an elaboration of the system as a whole is now desirable, and this is hereinafter set forth with particular reference to FIGS. 6 and 7. Both of these figures are schematic mechanical respresentations of aspects of the complete apparatus, exclusive of details of the computational networks of FIGS. 1–5 in the interests of simplicity of showing. In addition, all interlocking circuitry required for the reservation of a given channel to a particular mode of computation, such as that of Sample (s) or Reference (r), together with the operation of register brakes, indicator lights and the like have been omitted, because these constitute details familiar to persons skilled in the art and therefore adapted to a wide variety of conventional design choice, or even elimination as not absolutely essential.

The apparatus of FIG. 6 is devoted exclusively to the computation of the cube root differences $(F_{sG}^{1/3}-F_{rG}^{1/3})$, $(F_{sR'}^{1/3}-F_{rR'}^{1/3})$ and $(F_{sB}^{1/3}-F_{rB}^{1/3})$, while the apparatus of FIG. 7 completes the computation to yield $\Delta L$, $\Delta a$ and $\Delta b$ in the course of the manual null balancing, which is effected under the guidance afforded by meter 60 of sub-circuit No. 5, FIG. 5.

The preferred embodiment described in detail herein employs individual function generating electrical circuits and reference voltage networks for the handling of each of the three respective computations Green, Red (actually Red-Prime) and Blue, conventionally in the order named, and it is convenient to consider each computation sub-assembly as an individual "channel." However, it is advantageous to employ a single null-detection circuit including but one $V_1$ dual triode tube to service all three of the channels, and this has been done as hereinafter described.

Referring to FIG. 6, the channel reserved for the computation of $(F_{sG}^{1/3}-F_{rG}^{1/3})$ is seen to be completely separate and independent of the two other channels. Thus, reflectance factors $F_{rG}$ and $F_{sG}$ are entered by handwheels 71 and 72, respectively, which are respectively shaft-connected to 100-turn registers 73, reserved for the reference, and 74, reserved for the sample under test. Simultaneously, handwheels 71 and 72 introduce the same inputs to opposite sides of the mechanical differential 75. Since there is some danger that subsequent insertion of the $F_{sG}$ data might alter the registered value of $F_{rG}$ by reaction through differential 75, it is preferred to incorporate a friction brake 70 which securely locks the $F_{rG}$ input against any inadvertent dislodgement. The output of 75 is a rotation of a shaft 76 proportional to $F_{sG}-F_{rG}$ which positions the adjustable contact of the $R_p$ potentiometer 77 to eventually impress on the right-hand grid of $V_1$ (refer FIG. 5) a potential of a magnitude and phase indicative of the magnitude and sign of the product $(F_{sG}-F_{rG})f_1(F_{sG})f_2(F_{sG})$. Handwheel 72 is shaft-connected through 10:1 speed reducer 78 with the ganged contacts of the two loaded potentiometers corresponding to sub-circuits No. 2, i.e., $f_1(F_s)$, and No. 3, i.e., $f_2(F_s)$, of FIG. 4, represented schematically by blocks 79 and 80, respectively, in FIG. 6. Thus, manipulation limited solely to the turning of handwheels 71 and 72 to the given values of reflectance of reference and sample, respectively, automatically introduces all of the input data necessary to computation and, in fact, completes the computation of $(F_{sG}^{1/3}-F_{rG}^{1/3})$ to a stage where it requires only the final refinement, which is introduced simultaneously with the manual null-balancing during readout.

At this point it is desirable to enter the red reflectances $F_{rR}$ and $F_{sR}$. The introduction of these values is effected simply by turning the handwheel 84 connected to 100-turn register 85, reserved for the reference, to the given numerical value of $F_{rR}$ and conducting exactly the same operation for $F_{sR}$ by manipulation of its reserved handwheel 86 to the appropriate value displayed on sample register 87. Again it is desirable to provide a brake 88 locking the $F_{rR}$ reading in place to insure that differential 89 yields an accurate output $(F_{sR}-F_{rR})$ delivered to a shaft 90. Because $(F_{sR}-F_{rR})$ is employed for a transitional calculation within the computer as hereinafter described, it is desirable to lock it against inadvertent alteration, and this is conveniently effected by brake 91. $(F_{sR}-F_{rR})$ is stored temporarily as one input of a mechanical differential 94 reserved to the calculation of $$F_{sR'}-F_{rR'}=0.8(F_{sR}-F_{rR})+0.2(F_{sB}-F_{rB})$$

as hereinafter described, by introduction through a 1:1.6 gear reducer 93.

$F_{sR}$, concurrent with its registration, is introduced through a 1:1.6 gear reducer 98 to one input of a third mechanical differential 99 which is reserved for the transitional calculation within the computer of $$F_{sR'}=0.8\ F_{sR}+0.2\ F_{sB}$$

and is temporarily stored here until after introduction of the Blue reflectance data.

Again, in a manner similar to that for the Green and Red data, $F_{rB}$ is introduced by turning its reserved handwheel 102 to the given numerical value displayed on $F_{rB}$ register 103, the shaft being then locked against accidental movement by brake 104. Next, the $F_{sB}$ data is introduced through its reserved handwheel 105 and displayed on sample register 106. As in the case of the Green data, $F_{rB}$ is introduced to one input of a differential 107 and $F_{sB}$ to the other input, as indicated by the broken lines drawn in in FIG. 6, giving as the output $F_{sB}-F_{rB}$, which is evidenced as a quantitative rotation of shaft 108 accompanied by a proportionate movement of the contact of the Blue potentiometer $R_p$ denoted at 109. The turning of handwheel 105 simultaneously introduces $F_{sB}$ through 10:1 gear reducer 110 to the ganged contacts $R_a$ and $R_d$ of the $f_1$ $(F_{sB})$ and $f_2(F_{sB})$ networks, detailed as sub-circuits No. 2 and No. 3 of FIG. 4 and denoted as blocks 111 and 112, respectively, in FIG. 6.

For effecting the necessary transitional computations into Red-Prime equivalent reflectances, $F_{sB}-F_{rB}$ is also introduced to one input of mechanical differential 94 through shaft 115 running to 2.5:1 gear reducer 116 and $F_{sB}$ is similarly transmitted as one input of differential 99 via shaft 117 connected with 2.5:1 gear reducer 118. Under these conditions, the output of 94 is a rotation of shaft 119 which is proportional to $$F_{sR'}-F_{rR'}=0.8(F_{sR}-F_{rR})+0.2(F_{sB}-F_{rB})$$

and this shifts the contact $R_p$ of the potentiometer, designated 120, to a proportional position for later utilization. Similarly, the output of differential 99 is $$F_{sR'}=0.8\ F_{sR}+0.2\ F_{sB}$$

and this is transmitted as a rotation of shaft 121 through 10:1 gear reducer 122 to the ganged contacts $R_a$ and $R_d$ of the $f_1(F_{sR'})$ and $f_2(F_{sR'})$ loaded potentiometers denoted, respectively, 123 and 124. This completes the introduction of data and part of the computation as well, the remainder being carried out in the course of the manual null-balancing by operation of the readout mechanical sub-assembly shown in FIG. 7.

As a general operation, null-balancing is achieved by appropriate movement of a shaft, such as 48, FIG. 5, to position the ganged contacts of the two potentiometers $R_H$ and $R_Q$ of a reference voltage network for each individual computation channel so that the output, impressed on the left-hand grid of $V_1$, will exactly counterbalance the output of contact 40, $R_p$, impressed on the right-hand grid, as indicated by the needle of meter 60 taking zero position. As with the data introduction hereinbefore described, readout has been simplified to the manipulation of three handwheels to effect three individual null-balancings in sequence, a conventional electrical switching circuit, not detailed, being provided to interpose individual computation channels across $V_1$ in the order in which readings are desired.

For clarity in the explanation the final rotational positions taken by the several handwheel shafts at null-balance are denoted in FIG. 7, as $S_G$, $S_{R'}$ and $S_B$ which correspond, respectively, to $F_{sG}^{1/3}-F_{rG}^{1/3}$, $F_{sR'}^{1/3}-F_{rR'}^{1/3}$ and $F_{sB}^{1/3}-F_{rB}^{1/3}$.

Following the same order, namely Green, Red (actually Red-Prime) and Blue, for the readout as has hereinbefore been described for the data input, the Green channel is first switched into connection with the signal input to the null detector. This switching is effected by a multi-pole, multi-contact switch of conventional design, not detailed, which simultaneously switches in the rebalance voltage from the ΔL potentiometer $R_Q$, denoted 149 in FIG. 7. Then ΔL handwheel 147 is turned to rotate shaft 148, and from it potentiometers 149 and 150, which are, respectively, the $R_Q$ and $R_H$ potentiometers for this ΔL rebalance step. Rotation of handwheel 147 is halted when the voltage from these potentiometers has brought the meter 60 unbalance to zero, whereupon introduction of a first input denoted $S_G$, proportional to $(F_{sG}^{1/3}-F_{rG}^{1/3})$, is completed with respect to $\Delta b$ differential 134. Simultaneously, through a 1:1 gear step not shown in FIG. 7, the negative of $(F_{sG}^{1/3}-F_{rG}^{1/3})$, denoted $-S_G$, is introduced as a first input to $\Delta a$ differential 143 and, in addition, $S_G$ is registered on $\Delta L$ register 151 directly as one of the difference co-ordinates sought. This results through proper choice of register design, whereby the registration of 151 is preferably made inclusive of the multiplying factor 25.29 of Equation 2. An $S_G$ brake 152 is provided as a safeguard against subsequent coercion of shaft 148 and all sub-shafts connected with it during later balancing operations.

The next channel switched in is the Red (actually Red-Prime), as to which the $\Delta a$ handwheel 138 is the appropriate readout control. Handwheel 138 is manipulated to adjust the corresponding $R_Q$ and $R_H$ ganged contacts 139 and 140, FIG. 7, by rotation of shaft 141, which introduces $(F_{sR'}^{1/3}-F_{rR'}^{1/3})$ as a positive input $S_{R'}$ to $\Delta a$ mechanical differential 143 when meter 60 is brought to zero unbalance. Again, a brake 142 is provided to lock shaft 141 against coercion.

Finally, the Blue channel is switched in and the $\Delta b$ handwheel 129 is operated to adjust potentiometers 131 and 132, which are, respectively, the $R_Q$ and $R_H$ potentiometers for the $\Delta b$ rebalance step, to again bring meter 60 to zero unbalance. A 1:1 gear step not shown in FIG. 7 effects a reversal of rotation of the output of shaft 130 to $\Delta b$ differential 134, so that a displacement $-S_B$, proportional to the negative value of $(F_{sB}^{1/3}-F_{rB}^{1/3})$, actually is introduced into this differential. $S_B$ brake 133 on shaft 130 is provided to lock this shaft against coercion.

Differentials 134 and 143 are both designed to give a 2:1 reduction to their outputs, whereupon the output of $\Delta b$ differential 134 is proportional to one-half $$[(F_{sG}^{1/3}-F_{rG}^{1/3})-(F_{sB}^{1/3}-F_{rB}^{1/3})]$$

and the output of the $\Delta a$ differential 143 is proportional to one-half $$[(F_{sR'}^{1/3}-F_{rR'}^{1/3})-(F_{sG}^{1/3}-F_{rG}^{1/3})]$$

The former is transmitted through 1:3.3 gear reducer 156 to $\Delta b$ output register 157 whereas the latter is transmitted through 1:8.4 gear reducer 158 to $\Delta a$ output register 159, these reduction ratios being related to the $\Delta L$ output displayed on register 151 so as to effectively incorporate the multipliers 106 and 42.34 applicable to $\Delta a$ and $\Delta b$ Equations 3 and 4, respectively. Consequently, the output registers 157 and 159 register directly $\Delta b$ and $\Delta a$, respectively.

The three registers 151, 157 and 159 are geared type dual bank designs and the gear ratios for each drive shaft position are selected to suit the range of $(F_{sG}^{1/3}-F_{rG}^{1/3})$ which the computer will handle, i.e., ±5 revolutions of the $\Delta L$ output register 151. This figure was chosen to permit full 10-turn rotation of the $R_Q$ and $R_H$ potentiometers 149 and 150 in the Green channel over the range ±5 N.B.S. units for which the computer was designed. Since the apparatus provides information on the polarity of color differences, conventional dual-bank output registers are employed and the register shafts mechanically connected so that, for positive values of $\Delta L$, $\Delta a$ and $\Delta b$ the right-hand banks of numbers are exposed, whereas, where the converse is true, the left-hand banks are exposed.

Certain desirable auxiliaries, such as conventional indicator lights for specific channel and mode "in-use" designation, and the like, are preferred in a complete instrument and these are mentioned in passing in the following description, without further elaboration, since they are not essential to the functioning of this invention.

Referring to FIG. 8, which is a view of the front face of a typical apparatus constructed according to this invention, 163 represents the housing within which is mounted all of the electrical circuitry and mechanical appurtenances hereinbefore described, it being practicable to utilize a compact arrangement having maximum dimensions of 12" x 12" x 16". The same reference characters hitherto used are continued throughout the following description as regards identical components.

Housing 163 is provided with an electrical supply cord and plug (not shown) adapted for connection with a 115 v., 60 c. source, and there is a main power switch 164 which, in "ON" position, signaled by light up of an indicator lamp 165, applies power to the entire circuit.

The six handwheels 71, 72, 84, 86, 102, and 105 adapted to enter reflectance values on the corresponding G(reen), R(ed), and B(lue) registers are disposed at the upper left-hand corner of the housing, the three Sample register faces 74, 87 and 106 in the order of colors mentioned being arrayed on the right, while their Reference counterparts, 73, 85 and 103, respectively, are on the left. Each register is provided with an individual indicator lamp 166 signaling when the register is connected in operative circuit.

There is provided a two-position mode selection switch 169, which selectively interposes in circuit either the Reference or Sample networks of any given channel at the will of the operator, and also an effectively six-position selector switch 170 which operates the individual shaft brakes, indicator lamps and electronic switching of any given function generator and its reference voltage network in circuti with tube $V_1$ of the common null detection circuit. Null-balancing is indicated by panel meter 60 immediately below switch 170, and the three readout handwheels 129, 147 and 138 are disposed in the lower half of the left side adjacent their respective associated color difference co-ordinate dual registers 157 for $\Delta b$, 151 for $\Delta L$, and 159 for $\Delta a$, each of which latter is provided with an individual indicator lamp 171. In at least one commercial register of this type, convenient plus and minus sign remainder tabs 172 and 173, respectively, are provided adjacent the opposite side edges of the readout registers and come into play automatically as a reminder to the operator that each register reading is possessed of a characteristic polarity.

The apparatus is calibrated with the aid of a precalculated set of reflectances together with their corresponding color co-ordinate differences. The preferred initial calibration point for the several channels is that at which $(F_s^{1/3}-F_r^{1/3})=-0.198$ for the Green channel, $-0.119$ for the Blue channel and $-0.047$ for the Red-Prime channel, because at these differences the arms of the potentiometers $R_Q$ and $R_H$ in each of the channels are, for the accuracy desired, at their upper extremes. Values of the sample and reference reflectances at which the difference of their cube roots equals $-0.198$ are as follows, the corresponding color coordinate differences being given in each case and, where related values are also involved, these being indicated in parentheses adjacent their principals.

| Sample Reflectance | Reference Reflectance | Color Co-ordinate Difference |
|---|---|---|
| Green $F_{sG}=15.96$ | $F_{rG}=20.00$ | $\Delta L=-5.00$ |
| Red $F_{sR}=18.90$ ($F_{sB}=5.00$) | $F_{rR}=20.05$ ($F_{rB}=5.0$, $\Delta L=0$) | $\Delta a=-5.00$ |
| Blue $F_{sB}=17.22$ | $F_{rB}=20.03$ ($\Delta L=0$) | $\Delta b=+5.00$ |

Calibration is carried out, as a first step, by setting the input reflectance registers to the listed values by rotation of their individual hanwheels and by setting the output registers to the listed values of the co-ordinate differences, disregarding for the moment any indications of unbalance displayed by meter 60. Following this, in each channel in turn the $R_A$ potentiometers are internally adjusted by hand until meter 60 reads zero unbalance.

The final step in the calibrations involves the use of a second set of precalculated reflectances together with their corresponding co-ordinate differences for the opposite extreme condition where the respective cube root differences of the reflectances are: Green channel +0.198, Blue channel +0.119 and Red-Prime channel +0.047. The tabulation of these reflectances, corresponding co-ordinate values and related settings is as follows:

| Sample Reflectance | Reference Reflectance | Color Co-ordinate Difference |
|---|---|---|
| Green $F_{sG}=24.37$ | $F_{rG}=20.00$ | $\Delta L=+5.00$ |
| Red $F_{sR}=21.25$ ($F_{sB}=5.00$) | $F_{rR}=20.05$ ($F_{rB}=5.0$, $\Delta L=0$) | $\Delta a=+5.00$ |
| Blue $F_{sB}=22.77$ | $F_{rB}=20.03$ ($\Delta L=0$) | $\Delta b=-5.00$ |

As before, the input and output registers are set by rotating their handwheels to the values tabulated. Then, in each channel in turn, contact 50 of potentiometer $R_D$ is internally set to such a position that the voltage unbalance of meter 60 is brought to zero. This completes the calibration procedure which need be repeated only at relatively long intervals, since the calibration can be altered only by deterioration of some of the potentiometers, which is ordinarily unlikely to occur.

A typical routine operation cycle for the apparatus described is as follows. The main power switch 164 is turned on and the circuit allowed to warm up for about two minutes prior to the performance of any computations.

The operator then places selector switch 170 in the G(reen) position and mode switch 169 in Reference position. The reflectance $F_{rG}$ of the reference is then manually entered by turning handwheel 71 until $F_{rG}$ register 73 displays the given G(reen) reflectance value for the Reference, this operation concurrently storing this value as one input of the $(F_{sG}-F_{rG})$ differential 75. The operator then turns selector switch 170 to R(ed) position, whereupon he enters $F_{rR}$ by turning handwheel 84 to the given value of the Reference, which is read on $F_{rR}$ register 85. This effectively introduces $F_{rR}$ as one input of the $(F_{sR}-F_{rR})$ differential 89, where it is stored until needed. Switch 170 is then rotated to B(lue) position, after which $F_{rB}$ is entered on register 103 by turning handwheel 102, simultaneously introducing this value as one input of $F_{sB}-F_{rB}$ differential 107 where it is stored. This completes the introduction of all Reference data necessary to the computation.

The operator then returns switch 170 to G(reen) position and snaps mode switch 169 to Sample position, which effects engagement of brake 70 and locks $F_{rG}$ register 73 against coercion. He then enters $F_{sG}$ by turning handwheel 72 until $F_{sG}$ register 74 displays the appropriate reading. This stores $F_{sG}$ as the other input of $(F_{sG}-F_{rG})$ differential 75 and the output transmitted via shaft 76 is $(F_{sG}-F_{rG})$, which immediately adjusts the $R_p$ potentiometer contact 40 (refer FIGS. 3 and 4) so that the first factor of the product $$(F_{sG}-F_{rG})f_1(F_{sG})f_2(F_{sG})$$

is set up. Hand-wheel 72 simultaneously adjusts the ganged contacts of loaded potentiometers 79 and 80 to set up the remaining factors of the G(reen) product, thereupon immediately making available $E_{7,8}$ G(reen) (refer FIGS. 4 and 5).

The operator then rotates switch 170 to R(ed) position, thereby engaging $F_{rR}$ brake 88, and enters $F_{sR}$ on its register 87 by turning handwheel 86, thereby simultaneously entering $F_{sR}$ as the second input of $(F_{sR}-F_{rR})$ differential 89. This immediately introduces $(F_{sR}-F_{rR})$ through shaft 90 and gear reducer 93 as the first input of the $(F_{sR'}-F_{rR'})$ differential 94. Concurrently $F_{sR}$ enters via speed reducer 98 as the first input of Red-Prime differential 99.

The operator next rotates switch 170 to B(lue) position, thus locking $F_{rB}$ brake 104 and also brake 91, and enters $F_{sB}$ on its register 106 using handwheel 105, simultaneously appropriately positioning the ganged contacts of loaded potentiometers 111 and 112, and entering the second input into the $(F_{sB}-F_{rB})$ differential 107. Differential 107, in turn, delivers $(F_{sB}-F_{rB})$ as output via shaft 108, suitably positioning the contact of 109 of B(lue) channel potentiometer $R_p$ and also, via shaft 115 and speed reducer 116, introducing the second input to $(F_{sR'}-F_{rR'})$ differential 94. Concurrently, this operation introduces the second input to Red-Prime differential 99 via shaft 117 and speed reducer 118. It is seen that this effectively sets up the products $$(F_{sB}-F_{rB})f_1(F_{sB})f_2(F_{sB})$$

and, as a result of the preselected reduction ratios of reducers 93 and 116, on the one hand, and reducers 98 and 118 on the other $(F_{sR'}-F_{rR'})f_1(F_{sR'})f_2(F_{sR'})$ on the remaining individual computation circuit actuated by the R(ed) and B(lue) channels jointly. Accordingly, $E_{7,8}$ B(lue) and $E_{7,8}$ Red-Prime are brought into existence at the contacts of B(lue) channel potentiometer $R_p$ and Red-Prime channel potentiometer $R_p$, respectively. This completes the introduction of data to the apparatus and the next operation is that of color difference co-ordinate readout.

Referring to FIGS. 7 and 8 particularly, this is achieved by turning switch 170 to ΔL position, thereby engaging shaft brakes 133 and 142, and impressing $E_{7,8}$ G(reen) on the reserved grid of coincidence tube $V_1$ and $E_{13,14}$ from the G(reen) channel potentiometer $R_Q$ (FIG. 5) on the other grid.

The output voltage $E_{15,16}$ G(reen) is amplified by 57 (FIG. 5) and displayed on panel meter 60 as a positive or negative deflection of the needle. The operator rotates handwheel 147 in an amount and direction such as to zero the meter, thus automatically performing the remainder of the ΔL computation. That is, the ganged contacts of $R_Q$ and $R_H$ potentiometers 149 and 150, respectively, are appropriately positioned until the sum of $E_{7,8}$ G(reen) and $E_{13,14}$ G(reen) is precisely zero and the measure of the color co-ordinate is displayed as ΔL on output register 151. This simultaneously applies the G(reen) input component to both the $\Delta b$ differential 134 and also to the $\Delta a$ differential 143, however, in the latter case, the shaft rotation is inverted by conventional gearing as hereinbefore described so that the input is accepted by differential 143 in the negative form. The ΔL co-ordinate registered reading is thus complete, whereas the $\Delta a$ and $\Delta b$ readings are not, pending balancing of the Red-Prime and B(lue) channels.

The operator next moves switch 170 to the $\Delta a$ position which immediately applies brake 152, locking this value against coercion, and also substitute the Red-Prime channel in circuit with tube $V_1$ in place of the G(reen) channel, so that $E_{7,8}$ of the Red-Prime channel is now applied to the reserved grid of $V_1$ while $E_{13,14}$ of the Red-Prime channel is applied to the other grid. This gives an output voltage $E_{15,16}$ which is displayed on meter 60 and brought to zero, i.e., null-balance, by appropriate manipulation of $\Delta a$ handwheel 138 which positions the ganged contacts of $R_Q$ and $R_H$ potentiometers 139 and 140 so that the sum of $E_{7,8}$ and $E_{13,14}$ is exactly zero. Concurrently, the R(ed) channel shaft position is applied as the second input to $\Delta a$ differential 143, thereby rotating the output shaft and adjusting the reading displayed on register 159, as qualified by speed reducer 158, so that its final reading is effectively, the color difference co-ordinate $\Delta a$.

The final operation of the computation cycle is now effected by the operator switching 170 to $\Delta b$ position, which retains application of shaft locking brake 152 and places the B(lue) channel in circuit in place of the Red-Prime channel, displaying $E_{15,16}$ of the B(lue) channel on meter 60. In a manner similar to that hereinbefore described, the counter voltage $E_{13,14}$ of the B(lue) channel is adjusted to balance out $E_{7,8}$ B(lue) by manipulation of $\Delta b$ handwheel 129, which correspondingly adjusts the ganged $R_Q$ and $R_H$ contacts of potentiometers 131 and 132. This shaft position also provides the second input of the $\Delta b$ differential 134 which is, however, converted to a negative rotation, as hereinbefore mentioned, thereby rotating the differential output shaft an amount qualified by speed reducer 156, to display on $\Delta b$ output register 157 the color difference co-ordinate $\Delta b$. With this, the computation cycle is complete and the operator merely has to record the three readings ΔL, $\Delta a$ and $\Delta b$ before going on to another reading.

Frequently, it is necessary to compare a number of successive Samples with a given Reference and, if this is the situation, switch 169 is simply retained in Sample mode position and the computation cycle repeated as many times as necessary without alteration of the original Reference settings.

The nature of the computer described permits individual sub-assembly periodic operation and calibration checks which conveniently involve the use of dummy programs containing compilations of vertified values of ΔL, $\Delta a$ and $\Delta b$, respectively, obtained from preselected reflectance values distributed at appropriate intervals over the entire instrument range. Typically, three dummy programs, such as $F_{sG}$ v. ΔL, $F_{sR}$ v. $\Delta a$ and $F_{sB}$ v. $\Delta b$, permit a rapid and selective check-down of a given computer which, if it does not show color difference co-ordinates within about +0.1 N.B.S. unit of those tabulated, can be assumed to be in need of adjustment or repair.

An alternative less-preferred design over that described in detail incorporated a somewhat different mechanical arrangement, in that single input registers adapted for sequential clutch operation in the modes Reference and Sample were provided as well as three data input handwheels as opposed to six. However, this was disadvantageous, because the displayed registration of $F_r$ was "lost" while $F_s$ was entered, and this could result in error undetectable by the operator if the clutch slipped during $F_s$ introduction. Moreover, the clutch system required restoration of the $(F_s - F_r)$ potentiometer $R_p$ to zero after each Reference reflectance was entered, although this was readily accomplished automatically as an incidental operation of a servomechanism which effected the null-balancing. Due to the large range of unbalance voltages encountered, conventional servomechanisms proved to be quite slow and manual rebalancing was, in general, speedier, as well as simpler to accomplish. Moreover, the electrical circuitry necessary when a servomechanism is employed becomes quite complex, increasing both the first cost and maintenance cost.

While no compensation for change in $\alpha_1$ in the $f_1(F_s)$ sub-circuit No. 2 together with adjustment of attenuation for the $f_2(F_s)$ sub-circuit No. 3 is necessary where extreme accuracy is not essential, it is preferred to accomplish such a compensation by introduction of a correction function, and FIG. 5 shows how this can be done via the left-hand side of the apparatus. It is also possible to effect the compensation via the right-hand side of the apparatus, which is employed for the rough generation of the color function, using the circuit embodiment depicted in FIG. 4*a*.

Figure 4A:
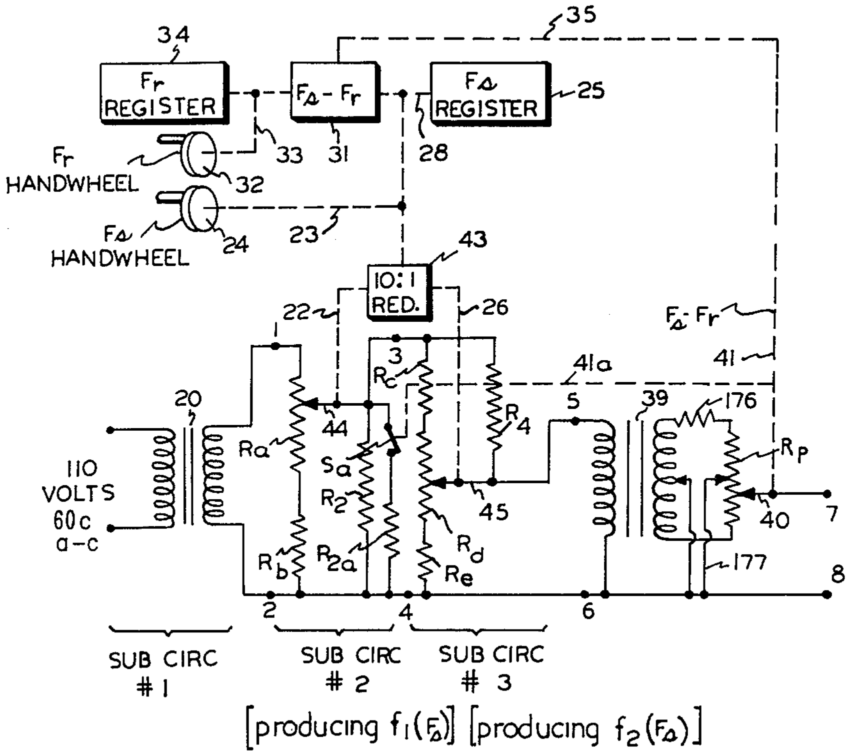

Referring to FIG. 4*a*, there is shown a circuit modification of the powered loaded potentiometer cascaded electrical network inclusive of sub-circuits No. 1–No. 3, which permits elimination of arm 52 of mechanical connection 48 together with potentiometers $R_H$ and $R_D$, point 11 being then connected directly to point 9, all shown in FIG. 5. This modification is relatively simple to effect and entails the addition of only four electrical components, plus one mechanical connection, to the basic circuit of FIG. 4. Thus, a shunting resistor $R_{2a}$ (typically 1200 ohms) is provided around resistor $R_2$ and the shunt connection completed via a switch $S_a$ which is operated by a mechanical branch connection **41*a* actuated by 41. In addition, the secondary loop of transformer 39 is provided with a resistor 176 (typically 237 ohms) and potentiometer $R_p$ is provided with a center tap 177, running to zero voltage, dividing its full expanse of 1000 ohms total resistance into 500 ohms in each half. Accordingly, the fraction of voltage reduction for the upper half of $R_p$ with resistor 176** in circuit therewith is 0.680, which is precisely the attenuation factor hereinbefore adduced for the condition $F_s \leqslant F_r$.

The circuit of FIG 4*a* is shown in its state when the difference $F_s - F_r >$zero, in which case tap 40 is disposed below center tap 177 of $R_p$. In operation, switch $S_a$ is made to close by mechanical connection **41*a* at all times when tap 40 is below the mid-point. Thus, switch $S_a$ is effective to interpose resistor $R_{2a}$ in parallel with $R_2$ for the condition $F_s - F_r >$zero, thereby reducing the potential at point 3** from its former value to a smaller value, which decreases $\alpha_1$ from 0.01 to 0.0075, which is necessary, as hereinbefore brought out when $F_s \leqslant F_r$. Conversely, when $F_s \leqslant F_r$, it is necessary to restore $\alpha_1$ to its former value of 0.01, and this is effected by the opening of $S_a$.

Thus, the compensation of the voltage output of the powered loaded potentiometer cascaded electrical network can be applied either internally or externally of this network as a matter of design choice.

The embodiment of this invention utilizing a voltmeter as the means registering the approximation to the difference $(F_s^{1/a} - F_r^{1/a})$, in conjunction with the circuit of FIG. 4*a*, makes it possible to eliminate sub-circuits No. 4 and No. 5 of FIG. 5 in their entireties, as well as the mechanical registers co-operating therewith, by merely substituting the voltmeter across points 7 and 8 of the circuitry connected with the right-hand triode section of $V_1$ as seen in FIG. 5. The voltage indicated on such a voltmeter is then directly proportional to the desired function and is, therefore, a measure of the function, the factor $C_1$ being part of the scale factor of the meter.

Alternatively, the several voltages across the points 7 and 8 in each of the channels may be combined electrically, and the resultant voltage measured by voltmeter, or by an electromechanical arrangement similar in nature to those hereinbefore described.

It will be understood that the voltmeter embodiment of this invention is most useful where the determination of $(F_s^{1/a} - F_r^{1/a})$ per se is the objective and that, where one desires to combine several functions, such as in the determination of $\Delta a$ and $\Delta b$ as hereinbefore described, the electromechanical embodiment is preferred, since it extends the computation correspondingly and therefore results in proportionate saving of human computational effort.

The determination of ΔL, $\Delta a$ and $\Delta b$ together is, as hereinbefore brought out, a relatively involved process, so that the complete calculation constitutes, in reality, the total of a number of ordered precedent steps, the mechanization of any particular one or more of which is advantageous in itself and is actually what this invention in its full scope accomplishes. Accordingly, the term "registering" as employed in the claims is intended to have the broadest meaning which the word comprehends, since it can entail the quantitative rotation of a shaft as hereinbefore described, the stepping of a dual bank "register," or the unique positioning of any one or several other equivalent agencies known to the art and therefore not requiring further elaboration herein.

The apparatus herein described in detail employed, as the adder, a dual triode tube $V_1$; however, it will be understood by persons skilled in the art that other types of adding circuits, such as resistive or transformer networks, can be utilized for this purpose and no limitation is implied from this specific choice. Also, while A.-C. powering is preferred, it will be understood that D.-C. powering can be employed if desired. One circuit arrangement for D.-C. powering can dispense with transformers such as 20, 39 and 51 and substitute as dividing elements to obtain the equivalent of "phase change" (actually sign change) a center contact on both the $R_p$ and $R_Q$ potentiometers. However, this has the disadvantage that very high resistances of the order of megohms must be resorted to for the final potentiometers on both the data input and the balancing sides in order not to load the preceding stages. The output voltages appearing at the vacuum tube adder would, accordingly, be quite small and the difference voltage would tend to be obscured by tube "noise." Other adders are available, as hereinbefore mentioned, but they are more expensive and, thus far, less reliable in service. Nevertheless, this invention is still adapted to D.-C. powering and no restriction to A.-C. powering is implied from the choice of the specific apparatus hereinbefore described.

The versatility of the computer of this invention is demonstrated by the relatively wide range of application comprehended within the exponent variation of a $1/a$ between ½ and ⅕. This affords a freedom of accommodation of the apparatus to progressive improvements in precision of co-ordinate systems which can occur in the near or distant future as a result of additional research work. A typical example of this versatility is afforded by a test wherein the computer was calibrated according to data provided by the modified Adams color co-ordinate system hereinbefore mentioned, as distinguished from the cube root system described in greatest detail. It was found that the recalibrated apparatus gave output readings within a precision of ±0.15 N.B.S. unit with respect to the modified Adams color co-ordinate tables. This represents extremely satisfactory adaptation to a substantially different system of reference, in view of the fact that precision improvement is, of course, available by a preselection of the resistors of the several potentiometers and other well-known techniques.

From the foregoing it will be understood that this invention provides a relatively simple computer capable of effecting a relatively complex and extremely tedious computation by the most simple of manipulations with a very high order of reliability. Since many modifications can be made with departure from the essential spirit of the invention, it is intended to be limited only within the scope of the appended claims.

We claim:

1. A computer for the determination of an approximation to the difference $(F_s^{1/a}-F_r^{1/a})$ where $F_s$ and $F_r$ are, respectively, any two numerical quantities and $a$ lies between 2 and 5 comprising in combination a powered loaded potentiometer cascaded electrical network for obtaining as a first term the function $$\left[\frac{F_s^{1/a}+C_2}{F_s}\right]$$

where $C_2$ is a constant, means for determining as a second term the difference $(F_s-F_r)$, means for generating a constant term $C_1$, means for obtaining the product of said first term, said second term and said constant term $C_1$, which product is an approximation to said difference $(F_s^{1/a}-F_r^{1/a})$, and means for registering said approximation to the difference $(F_s^{1/a}-F_r^{1/a})$.

2. A computer for the determination of an approximation to the difference $(F_s^{1/a}-F_r^{1/a})$ where $F_s$ and $F_r$ are, respectively, any two numerical quantities and $a$ lies between 2 and 5 comprising in combination a powered loaded potentiometer cascaded electrical network for obtaining as a first term the function $$\left[\frac{F_s^{1/a}+C_2}{F_s}\right]$$

where $C_2$ is a constant, means for determining as a second term the difference $(F_s-F_r)$, means for generating a constant term $C_1$, and means for obtaining the product of said first term, said second term and said constant term $C_1$, which product is an approximation of said difference $(F_s^{1/a}-F_r^{1/a})$, a powered reference voltage circuit including a potentiometric cascaded electrical network and a null detector, said potentiometric cascaded network being connected in opposed circuit relationship through said null detector with said powered loaded potentiometer cascaded electrical network, and means responsive to said powered reference voltage circuit for registering said approximation to said difference $(F_s^{1/a}-F_r^{1/a})$.

3. A computer for the determination of an approximation to the difference $(F_s^{1/a}-F_r^{1/a})$ according to claim 2 wherein means are provided to impose a correction function compensating the voltage output of said powered loaded potentiometer cascaded electrical network for distortion arising out of changes in magnitude as a function of the polarity and attenuation of the voltage in said powered loaded potentiometer electrical network together with those due to approximations resorted to in the mathematical method employed for the determination of said difference $(F_s^{1/a}-F_r^{1/a})$.

4. A computer for determination of an approximation to the difference $(F_s^{1/a}-F_r^{1/a})$ according to claim 2 wherein said powered loaded potentiometer cascaded electrical network for obtaining said function $$\left[\frac{F_s^{1/a}+C_2}{F_s}\right]$$

is a 3-stage loaded linear potentiometer having a first section of loaded linear potentiometer connected in electrical cascade circuit with a second section of loaded linear potentiometer, said second section being loaded in an opposite sense to said first section, a common gang connection with the movable contacts of said first section and said second section, and a third potentiometric section in combination with said first section and said second section effecting a small final adjustment in said product of said first term, said second term and said constant term $C_1$ proportional to the magnitude of said product.

5. A computer for the determination of an approximation to the difference $(F_s^{1/3}-F_r^{1/3})$ for a preselected one of the properties reflectance and transmission, where the subscripts $s$ and $r$ denote Sample and Reference, respectively, comprising in combination a powered loaded potentiometer cascaded electrical network for obtaining as a first term the function $$\left[\frac{F_s^{1/3}+C_2}{F_s}\right]$$

where $C_2$ is a constant, means for determining as a second term the difference $(F_s-F_r)$, means for generating a constant term $C_1$, and means for obtaining the product of said first term, said second term and said constant term $C_1$, which product is an approximation of said difference $(F_s^{1/3}-F_r^{1/3})$, a powered reference voltage circuit including a potentiometric cascaded network and a null detector, said potentiometric cascaded network being connected in opposed circuit relationship through said null detector with said powered loaded potentiometer cascaded electrical network, means imposing a correction function compensating the voltage output of said powered loaded potentiometer cascaded electrical network for distortion arising out of changes in magnitude as a function of the polarity of the voltage in said powered loaded potentiometer electrical network together with those due to approximations resorted to in the mathematical method employed in the computation, and means responsive to said powered reference voltage circuit for registering a multiple of said approximation to said difference $$(F_s^{1/3}-F_r^{1/3})$$

6. A computer for the determination of an approximation to a color co-ordinate difference $C(F_s^{1/3}-F_r^{1/3})$ for a preselected one of the properties reflectance and transmission, where C is a constant and the subscripts $s$ and $r$ denote Sample and Reference, respectively, comprising in combination a powered loaded potentiometer cascaded electrical network for obtaining as a first term the function $$\left[\frac{F_s^{1/3}+C_2}{F_s}\right]$$

where $C_2$ is a constant, means for determining as a second term the difference $(F_s-F_r)$, means for generating a constant term $C_1$, and means for obtaining the product of said first term, said second term and said constant term $C_1$, which product is an approximation of the difference $(F_s^{1/3}-F_r^{1/3})$, a powered reference voltage circuit including a potentiometric cascaded network and a null detector, said potentiometric cascaded network being connected in opposed circuit relationship through said null detector with said powered loaded potentiometer cascaded electrical network, means imposing a correction function compensating the voltage output of said powered loaded potentiometer cascaded electrical network for distortion arising out of changes in magnitude as a function of the polarity of the voltage in said powered loaded potentiometer electrical network together with those due to approximations resorted to in the mathematical method employed in the computation, means for generating said constant term C, means for obtaining the product of C and said difference $(F_s^{1/3}-F_r^{1/3})$, and means responsive to said powered reference voltage circuit for registering a multiple of said approximation to said color co-ordinate difference $C(F_s^{1/3}-F_r^{1/3})$.

7. An apparatus comprising in combination a first computer and a second computer, each computer comprising in combination a powered loaded potentiometer cascaded electrical network for obtaining as a first term the function $$\left[\frac{F_s^{1/3}+C_2}{F_s}\right]$$

where $C_2$ is a constant, means for determining as a second term the difference $(F_s-F_r)$, means for generating a constant term $C_1$, and means for obtaining the product of said first term, said second term and said constant term $C_1$, which product is an approximation of said difference $(F_s^{1/3}-F_r^{1/3})$, a powered reference voltage circuit including a potentiometric cascaded network and a null detector, said potentiometric cascaded network being connected in opposed circuit relationship through said null detector with said powered loaded potentiometer cascaded electrical network, means imposing a correction function compensating the voltage output of said powered loaded potentiometer cascaded electrical network for distortion arising out of changes in magnitude as a function of the polarity of the voltage in said powered loaded potentiometer electrical network together with those due to approximations resorted to in the mathematical method employed in the computation, and means responsive to said powered reference voltage circuit for registering a multiple of said approximation to said difference $(F_s^{1/3}-F_r^{1/3})$, wherein said first computer is reserved to the determination of an approximation to the difference $(F_{s1}^{1/3}-F_{r1}^{1/3})$, where the subscripts $s1$ and $r1$ denote sample and reference respectively for a first distinctive illumination, and said second computer is reserved to the determination of an approximation to the difference $(F_{s2}^{1/3}-F_{r2}^{1/3})$, wherein the subscripts $s2$ and $r2$ denote Sample and Reference respectively for a second distinctive illumination, means for effecting the subtraction of said approximation to the difference $$(F_{s2}^{1/3}-F_{r2}^{1/3})$$

from said approximation to the difference $(F_{s1}^{1/3}-F_{r1}^{1/3})$, and means for registering a multiple of the difference $$[(F_{s1}^{1/3}-F_{r1}^{1/3})-(F_{s2}^{1/3}-F_{r2}^{1/3})]$$

8. Apparatus for the determination of color difference co-ordinates as a function of the difference $(F_s^{1/3}-F_r^{1/3})$ for a preselected one of the properties reflectance and transmission, where the subscripts $s$ and $r$ denote Sample and Reference, respectively, comprising in combination a first computer channel reserved for the determination of an approximation to the difference $$(F_{sG}^{1/3}-F_{rG}^{1/3})$$

a second computer channel reserved for the determination of an approximation to the difference $$(F_{sR'}^{1/3}-F_{rR'}^{1/3})$$

and a third computer channel reserved for the determination of an approximation to the difference $$(F_{sB}^{1/3}-F_{rB}^{1/3})$$

where $F_{sR'}=0.8\ F_{sR}+0.2\ F_{sB}$ and $F_{rR'}=0.8\ F_{rR}+0.2\ F_{rB}$ and the subscripts G, R and B refer, respectively, to the standard Green, Red and Blue illuminants of the International Commission on Illumination, wherein said first, second and third computer channels each individually comprise the combination of a powered loaded potentiometer cascaded electrical network for obtaining as a first term the function $$\left[\frac{F_s^{1/3}+C_2}{F_s}\right]$$

where $C_2$ is a constant, means for determining as a second term the difference $(F_s-F_r)$, means for generating a constant term $C_1$, and means for obtaining the product of said first term, said second term and said constant term $C_1$, which product is an approximation of said difference $(F_s^{1/3}-F_r^{1/3})$, a powered reference voltage circuit including a potentiometer cascaded electrical network and a null detector, said potentiometric cascaded network being connected in opposed circuit relationship through said null detector with said powered loaded potentiometer cascaded electrical network, means imposing a correction function compensating the voltage output of said powered loaded potentiometer cascaded electrical network for distortion arising out of changes in magnitude as a function of the polarity of the voltage in said powered loaded potentiometer electrical network together with those due to approximations resorted to in the mathematical method employed in the computation, and means responsive to said powered reference voltage circuit for registering a multiple of said approximation to said difference $(F_s^{1/3}-F_r^{1/3})$, first transitional computational means responsive to said first computer channel and to said second computer channel determining the difference $$[(F_{sR'}^{1/3}-F_{rR'}^{1/3})-(F_{sG}^{1/3}-F_{rG}^{1/3})]$$

second transitional computational means responsive to said first computer channel and to said third computer channel determining the difference $$[(F_{sG}^{1/3}-F_{rG}^{1/3})-(F_{sB}^{1/3}-F_{rB}^{1/3})]$$

and means responsive to said first computer channel, said first transitional computational means and said second transitional computational means for registering multiples of color difference co-ordinates as a function of $$(F_{sG}^{1/3}-F_{rG}^{1/3}),\quad [(F_{sR'}^{1/3}-F_{rR'}^{1/3})-(F_{sG}^{1/3}-F_{rG}^{1/3})]$$

and $$[(F_{sG}^{1/3}-F_{rG}^{1/3})-(F_{sB}^{1/3}-F_{rB}^{1/3})]$$

respectively.

9. Apparatus for the determination of color difference co-ordinates according to claim 8 wherein said second computer channel is provided with means for the determination of $F_{sR'}$ as a function of $0.8\ F_{sR}+0.2\ F_{sB}$ and $F_{rR'}$ as a function of $0.8\ F_{rR}+0.2\ F_{rB}$.

References Cited by the Examiner

UNITED STATES PATENTS 3,048,329 8/1962 Berggren ---------- 235—193 X

MALCOLM A. MORRISON, *Primary Examiner.*